(12) United States Patent
Weinert et al.

(10) Patent No.: US 11,703,589 B2
(45) Date of Patent: Jul. 18, 2023

(54) LIDAR DEVICE HAVING A FOUR-PORT DUPLEXER AND METHOD FOR OPTICAL REMOTE SENSING

(71) Applicant: Fraunhofer-Gesellschaft zur Förderung der angewandten Forschung e.V., Munich (DE)

(72) Inventors: Carl-Michael Weinert, Berlin (DE); Nicolas Perlot, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 197 days.

(21) Appl. No.: 17/168,626

(22) Filed: Feb. 5, 2021

(65) Prior Publication Data

US 2021/0156997 A1 May 27, 2021

Related U.S. Application Data

(63) Continuation-in-part of application No. PCT/EP2018/071617, filed on Aug. 9, 2018.

(51) Int. Cl.
*G01S 17/04* (2020.01)
*G01S 17/931* (2020.01)
(Continued)

(52) U.S. Cl.
CPC .............. *G01S 17/04* (2020.01); *G01S 7/003* (2013.01); *G01S 7/484* (2013.01); *G01S 7/4813* (2013.01);
(Continued)

(58) Field of Classification Search
CPC ........ G01S 17/04; G01S 7/003; G01S 7/4813; G01S 7/4817; G01S 7/484; G01S 17/931;
(Continued)

(56) References Cited

U.S. PATENT DOCUMENTS 5,587,785 A * 12/1996 Kato ....................... G01S 17/95
356/28
5,864,391 A 1/1999 Hosokawa et al.
(Continued)

OTHER PUBLICATIONS

Keil et al., "Ultra low-loss 1 x 2 multiplexer using thin-film filters on polymer integration platform," Electronics Letters, Nov. 5, 2009, 45(23):1-2.
(Continued)

*Primary Examiner* — Jennifer D Bennett
*Assistant Examiner* — Erin R Garber
(74) *Attorney, Agent, or Firm* — Womble Bond Dickinson (US) LLP

(57) ABSTRACT

A LIDAR (1) includes at least one light emitting output (11) and at least one light receiving input (12), at least one light source (2) adapted to emit pulsed laser radiation and at least one light detector (3) adapted to receive reflected laser radiation. The light source (2) is coupled to a first port (411) of a duplexer (4), a fourth port (421) of the duplexer (4) is coupled to the light emitting output (11), and a third port (412) of the duplexer (4) is coupled to the light receiving input (12). A second port (422) of the duplexer (4) is coupled to the light detector (3). The LIDAR may be provided to a car or a robot, which employs the device and its method of operation, for optical remote sensing of a target (85).

21 Claims, 2 Drawing Sheets

(51) Int. Cl.
*G01S 7/00* (2006.01)
*G01S 7/481* (2006.01)
*G01S 7/484* (2006.01)
*G01S 17/89* (2020.01)
*G01S 17/10* (2020.01)

(52) U.S. Cl.
CPC .......... *G01S 7/4817* (2013.01); *G01S 7/4818* (2013.01); *G01S 17/10* (2013.01); *G01S 17/89* (2013.01); *G01S 17/931* (2020.01)

(58) Field of Classification Search
CPC ........ G01S 17/89; G01S 17/10; G01S 7/4818; G01S 13/04; G01S 7/4863; G01S 7/4812
See application file for complete search history.

(56) References Cited

U.S. PATENT DOCUMENTS

| | | | |
|---|---|---|---|
| 2002/0060784 A1 | 5/2002 | Pack et al. | |
| 2002/0075472 A1* | 6/2002 | Holton | G01S 7/4818 356/4.01 |
| 2007/0181810 A1 | 8/2007 | Tan et al. | |
| 2010/0271614 A1 | 10/2010 | Albuquerque et al. | |
| 2011/0032509 A1* | 2/2011 | Bridges | G01S 17/42 356/5.13 |
| 2011/0091155 A1 | 4/2011 | Yilmaz et al. | |
| 2011/0141471 A1* | 6/2011 | Schlotterbeck | G01P 5/26 356/342 |
| 2012/0236379 A1 | 9/2012 | Da Silva et al. | |
| 2014/0231647 A1 | 8/2014 | Chinn et al. | |
| 2014/0376001 A1* | 12/2014 | Swanson | G01N 21/17 356/479 |
| 2015/0185313 A1 | 7/2015 | Zhu | |
| 2015/0293224 A1 | 10/2015 | Eldada et al. | |
| 2018/0074196 A1 | 3/2018 | Weinberg | |
| 2019/0018113 A1* | 1/2019 | Sayyah | G01S 17/32 |
| 2020/0209020 A1* | 7/2020 | Issa | G01K 11/32 |

OTHER PUBLICATIONS

International Search Report dated May 20, 2019, in PCT/EP2018/071617.

Written Opinion of the International Search Authority dated May 20, 2019, in PCT/EP2018/071617.

* cited by examiner

LIDAR DEVICE HAVING A FOUR-PORT DUPLEXER AND METHOD FOR OPTICAL REMOTE SENSING

RELATED APPLICATIONS

The present application is a Bypass Continuation-in-part of International Application No. PCT/EP2018/071617, filed Aug. 9, 2018. The contents of the aforementioned application are incorporated by reference in their entirety.

FIELD OF THE INVENTION

The invention relates to a LIDAR system comprising at least one light emitting output and at least one light receiving input, at least one light source being adapted to emit pulsed laser radiation, and at least one light detector being adapted to receive reflected laser radiation The invention also relates to a method for optical remote sensing of a target.

BACKGROUND OF THE INVENTION

US 2018/0074196 A1 discloses a flash LIDAR system comprising an array of illuminators, an array of light detectors, and a signal processor. This known LIDAR system can effectively divide the field of view into a plurality of segments and each illuminator in the array can be made to correspond to a specific segment of the field of view. However, this known LIDAR system has the drawback of a small signal to noise ratio. Therefore, the spatial resolution within the field of view might be limited and small objects within the field of view might be missed.

Therefore, it is an object of the invention to provide a LIDAR and a method for optical remote sensing having increased sensitivity. Furthermore, it is an object of the invention to provide a LIDAR with high reliability.

SUMMARY OF THE INVENTION

According to the invention, this object is solved by a LIDAR device comprising at least one light emitting output and at least one light receiving input, and at least one light source being adapted to emit pulsed laser radiation and at least one light detector being adapted to receive reflected laser radiation, and comprising further at least one duplexer having four ports and being configured to guide laser radiation simultaneously from a first port to a third and a fourth port, wherein said light source is coupled to the first port of the duplexer, and the fourth port of said duplexer is coupled to said light emitting output, and
the third port of said duplexer is coupled to said light receiving input, and a second port of said duplexer is coupled to said light detector LIDAR comprising at least one light emitting output and at least one light receiving input.

BRIEF DESCRIPTION OF THE DRAWINGS

The accompanying drawings which are incorporated in and constitute a part of the specification, illustrate one or more embodiments described herein, and, together with the detailed description, explain these embodiments. In the drawings

DETAILED DESCRIPTION

Figure 1:
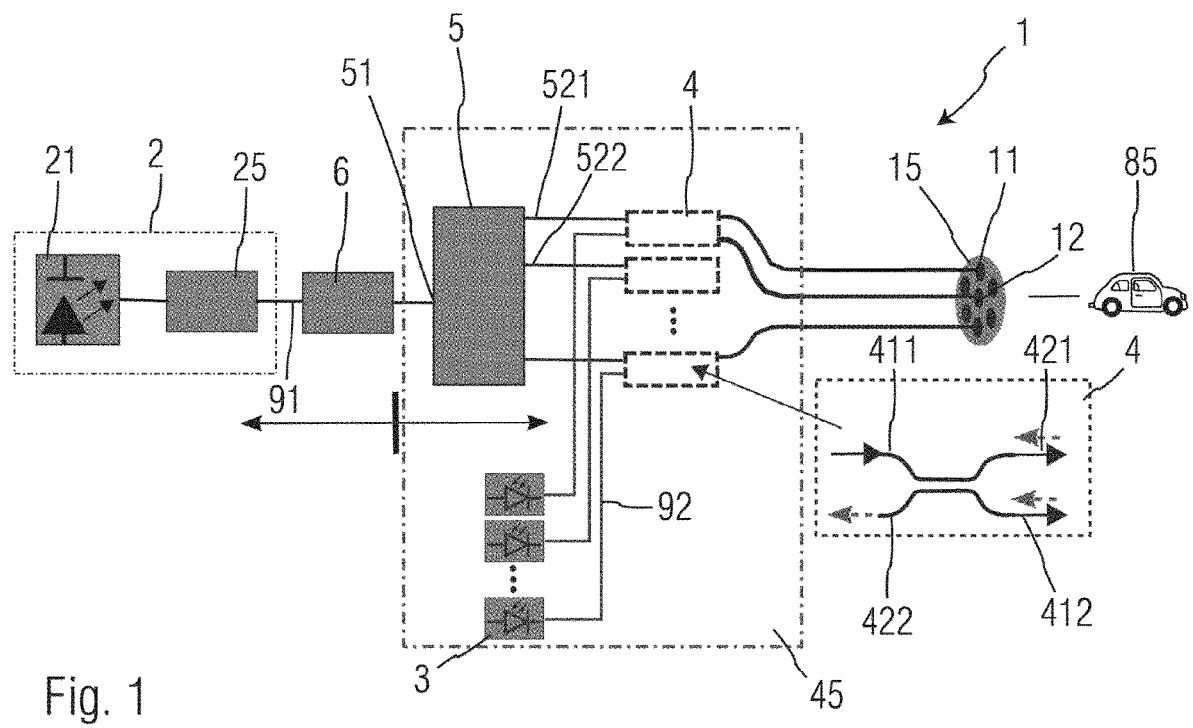
FIG. 1 illustrates a diagram of an exemplary first embodiment of a LIDAR system in accordance with the present invention.

The basic principle of the LIDAR system and the method of its operation consists in sending light to a target or a scene at least by the light emitting output and receiving reflected light at least by the light receiving input. The distance of the target can be determined by the time-of-flight of the optical signal.

According to the invention, the LIDAR comprises at least one light source being adapted to emit pulsed laser radiation having a first wavelength. As typical orders of magnitude, pulse durations can be selected between 100 ps up to 10 ns. In other embodiments, a pulse duration may be selected between 900 ps and 1100 ps. A pulse repetition time may be selected in some embodiments of the invention from the range between 100 µs and 10 ms. In other embodiments, the pulse repetition time may be selected between 900 µs and 1100 µs. The output of said at least one light source is coupled directly or indirectly with said at least one light emitting output. Therefore, light emitted from the first light source can be directed towards the target.

The target may reflect at least a portion of the incoming light. The reflected light is received by at least one light receiving input. In some embodiments, the light receiving input may receive only a portion of the reflected light. The received light is guided to at least one light detector. The time interval between the sending and the receiving operation gives the time-of-flight of the optical signal. Together with the known speed of light, the distance of the target may be determined.

The LIDAR may comprise an evaluation unit being adapted to measure the time-of-flight and to calculate at least one distance from the measured time-of-flight. In some embodiments, the evaluation unit may be adapted to store a plurality of target positions in the form of a cloud diagram or a scatter plot. Furthermore, the evaluation unit may comprise means for visualizing the scatter plot to a user or to send the data to other electronic systems such as an auto pilot. The evaluation unit may comprise any of a microprocessor, a microcontroller or some discrete analog or digital electronics such as amplifiers, storage, A/D-converters, D/A-converters, or time digitizers.

According to the invention, said light source is coupled to a first port of a duplexer, a fourth port of said duplexer is coupled to said light emitting output, a third port of said duplexer is coupled to said light receiving input and a second port of said duplexer is coupled to said light detector.

Thus, the duplexer comprises four connectors or ports. Any of these ports may bidirectionally act as an input or an output and guide coupled signals to other ports of the duplexer.

During operation of the LIDAR, the duplexer acts as follows: If the light source is operating, i.e. sending out light pulses, this light is coupled to the duplexer by means of the first port. The light exits the duplexer via the third and fourth port. As these ports are coupled to the light receiving input and the light emitting output of the LIDAR system, the input as well as the output emit light in the direction of the target.

Reflected light from the target reaches the light emitting output and the light receiving input. This results in the third and fourth port of the duplexer acting as input ports during the receiving operation. During the receiving operation, the second port is acting as an output port of said duplexer. Therefore, the reflected light can reach the light detector being coupled to said second port. As the reflected light coming from the target usually has little or no coherence, accidental interference between the two incoming signals of the third and fourth ports of the duplexer does not occur. This results in a 3 dB gain with respect to a single receive signal as for example by using a beam splitter mirror in a conventional monostatic LIDAR system. Therefore, the signal to noise ratio is increased which may result in an increased sensitivity in some embodiments of the invention.

In some embodiments of the invention, the light source may comprise a directly switched semiconductor laser. In other embodiments of the invention, the light source may comprise any other type of laser and an optional electro-optical modulator. In some embodiments of the invention, the light source may comprise an optical amplifier which is adapted to increase the power of the emitted laser light.

In some embodiments of the invention, the light detector may comprise at least one photodiode. In other embodiments of the invention, the light detector may comprise a photodiode array. In still other embodiments, the light detector may comprise a CCD detector.

In some embodiments of the invention, said duplexer may comprise at least one 3 dB-coupler. Such a coupler may comprise a 2×2-multimode coupler. In other embodiments, the coupler may comprise a fiber coupler.

In some embodiments of the invention, the LIDAR may comprise further at least one splitter having one input and a plurality of outputs, wherein said input is coupled to the light source and each of the outputs is coupled to a respective first port of a respective duplexer. Such an embodiment may increase the field of view of the LIDAR system as the splitter allows for a plurality of light emitting outputs and a plurality of light receiving inputs. The angle of emittance and/or the angle of acceptance of each pair of outputs and inputs may be different from the acceptance and emittance of the other pairs of light emitting outputs and light receiving inputs so that a single LIDAR system can send and receive light from different directions. Said splitter may operate in a sequential mode like an optical switch or a combiner. In other embodiments of the invention, the splitter may comprise an 1×n-multimode coupler so that a single light pulse is split up to all inputs at the same time.

In some embodiments of the invention, the number of duplexers, the number of light detectors, the number of light emitting outputs, and the number of light receiving inputs is less or equal to the number of outputs of the splitter. This results in an optimized use of the optical power of the at least one light source.

In some embodiments of the invention, the at least one light source may comprise a single mode laser.

In some embodiments of the invention, the light source, the optional modulator, the optional optical amplifier and the input of the splitter are connected to each other by single mode waveguides. In contrast, any of the outputs of the splitter, the duplexers, the light detectors, the light emitting outputs and the light receiving inputs are connected to each other by multimode waveguides. This feature has the technical effect that multimode waveguides have much larger core diameters than single mode waveguides which allows for much higher optical power to be transmitted. Furthermore, the single mode wave guides act as an optical filter and prevent reflected light from the target reaching the light source as explained in greater detail below.

In some embodiments of the invention, any of the splitter, the duplexers, the light detectors, and the waveguides are integrated on a chip. Such an embodiment results in a very reliable construction having a small assembly space and being more reliable due to the lack of any moving parts.

In some embodiments of the invention, the LIDAR may comprise further a front optics, wherein the light emitting output and the light receiving input are arranged on a first side of the optics and the scene or target is arranged on a second side of the optic. This may adapt the field of view of the LIDAR system to specific needs.

In some embodiments of the invention, the LIDAR may comprise further a second light source being adapted to emit pulsed laser radiation at a second wavelength different from the first wavelength of the first light source. In some embodiments, the second light source may be adapted to emit light at a different time than the first light source. In some embodiments, the LIDAR system may comprise further a bandpass filter between the fourth or third port of said duplexer and said light emitting output. The bandpass filter may be adapted to filter at least the second wavelength. Such a LIDAR system may have an increased spatial resolution as the light emitting output and the light receiving input act as different pixels, i.e. the two light emitting outputs and inputs coupled to a single duplexer act as two separate pixels.

In some embodiments of the invention, an optical axis of the light emitting output and an optical axis of the light receiving input coincides. This feature has the technical effect that due to the bidirectional operation of the light receiving input and the light emitting output the transmit radiation pattern of each element corresponds exactly to the detector's field of view of that specific element. The field of view is optimal in terms of angular background light rejection. This may increase the sensitivity further. In some embodiments of the invention, the light emitting output and the light receiving input of one respective pair may be arranged adjacent to each other.

In some embodiments of the invention, the wavelength of the laser light pulse is selected from the interval between 1450 nm and 1650 nm. In other embodiments of the invention, the wavelength of the laser light pulse is selected from the interval between 1500 nm and 1600 nm.

This feature has the effect that standard hardware known from telecommunication systems may be used which is readily available.

In some embodiments of the invention, the difference between the second wavelength and the first wavelength amounts to at least 20 nm. In some embodiments of the invention, the difference between the second wavelength and the first wavelength amounts to less than 200 nm.

Improved light detection and ranging (also referred to herein as LIDAR) systems and methods are disclosed for determining the distance to a target object or a scene disposed in a field of view of the LIDAR system. The LIDAR system according to the invention can effectively divide the field of view into a plurality of segments or pixels. Disclosed LIDAR systems and methods can avoid at least some of the drawbacks of conventional LIDAR systems and methods. In some embodiments of the invention, a spatial resolution of the disclosed LIDAR system may be increased compared to known LIDAR systems. In other embodiments of the invention, the sensitivity of a LIDAR system may be increased which may result in an increased range of detection or better spatial resolution.

To improve the range of a LIDAR system, the light source of the LIDAR system may scan the field of view in segments, selectively illuminating each of the smaller areas of the respective segments with one or more pulsed beams of light. Each subset of light detectors of the disclosed LIDAR system can then operate to receive light reflected from at least a portion of target object disposed in its corresponding segment of the field of view. Having scanned the field of view in segments and received light reflected from the target object, an evaluation unit of the disclosed LIDAR system may obtain a frame of data for each reflected pulsed beam and assemble said data to a scatter diagram.

In other embodiments of the LIDAR system, the light source may illuminate a plurality or all segments at the same time with at least one pulse of light. After having received light reflected from a target object in at least some of the segments, the evaluation unit may compose a scatter diagram of target objects in the whole field of view. This mode of operation of a LIDAR system may increase the data acquisition time.

In other embodiments, the LIDAR may use light of different wavelengths to reduce the size of the segments, thereby increasing the spatial resolution. In some embodiments of the invention, the LIDAR system may comprise different modes of operation to optimize spatial resolution, range, or speed depending the specific needs.

Turning now to the drawings, FIG. 1 depicts an illustrative embodiment of an exemplary LIDAR system according to one embodiment of the invention. The LIDAR system 1 shown in FIG. 1 may be a part of a car. More specifically, the LIDAR 1 may be part of an autonomous driving system of said car. Even more specifically, the LIDAR system 1 may be part of a speed control and/or a steering control and/or a collision warning system. In other embodiments, the LIDAR system 1 may be part of a robot or an industrial automation system, e.g. for sensing objects on a conveyor belt.

The LIDAR system 1 comprises at least one light source 2. The light source 2 may comprise in some embodiments a laser system 21. The laser system 21 may comprise a directly switched semiconductor laser or a gas laser or a fiber laser. The laser system 21 may be suitable for pulsed operation in dependence of a trigger signal generated by a control and evaluation system not shown. In other embodiments, the laser system 21 may operate in continuous wave mode.

Additionally, the light source 2 may comprise an optional modulator 25. The modulator may comprise an electro-optical chopper or a buncher in order to generate pulses from the laser system 21 or in order to shape or shorten pulses of a laser system 21 emitting pulsed laser radiation.

Furthermore, the LIDAR system 21 may comprise an optional optical amplifier 6. The amplifier 6 may increase the optical power generated by the light source 2.

In some embodiments of the invention, the laser system 21, the optional modulator 25 and the optional amplifiers 6 are interconnected to each other by single mode waveguides 91. Said single mode waveguides 91 may comprise single mode optical fibers or rib waveguides integrated on an optical chip. Such a single mode waveguide 91 may act as a bandpass filter having a small band width as described in more detail below.

The LIDAR system described comprises further at least one splitter 5. The splitter 5 has one input 51 and a plurality of outputs 521, 522, . . . . The total number of outputs may vary in different embodiments. In some embodiments of the invention, the total number of outputs may be selected between 2 and 30. In other embodiments, the total number of outputs may be selected from 4 to 15. In still other embodiments, the total number of outputs may be selected from 5 to 8.

The splitter 5 may comprise an optical switch or a combiner being adapted to connect exactly one output 521, 522, . . . to the input 51 at a time and sequentially switching the outputs 521, 522, . . . after a predetermined amount of pulses has been coupled from the input 51 to the respective output. In other embodiments of the invention, the splitter 5 may be a 1×n-multimode coupler coupling the input 51 to all outputs 521, 522, . . . at the same time. In still other embodiments of the invention, the at least one splitter 5 may allow for different modes of operation so that light from the input 51 can be coupled to a single output or a group of outputs or all outputs 521, 522, . . . depending on the selected mode of operation.

Each output of the splitter 5 is coupled to a respective first port 411 of a duplexer 4. The duplexer 4 has four connectors 411, 422, 412, 421 which are intended for bidirectional operation, i.e. each connector 411, 422, 412, 421 can be configured as an input or an output. As explained in more detail in the inset of FIG. 1, the duplexer 4 may comprise a 3 dB-coupler in some embodiments. Such a coupler may comprise a 2×2-multimode coupler or a fiber coupler. As shown in FIG. 1, the output 521 of the splitter 5 is coupled to the first port 411 of the duplexer 4. The light is distributed to a third port 412 and a fourth port 421 of the duplexer 4. All interconnects between the outputs of the splitter 5, the duplexers 4 and the output assembly 15 of the LIDAR system 1 are made by multimode waveguides 92.

The third and fourth ports 412 and 421 of the duplexer 4 are coupled to an output assembly 15 of the LIDAR system 1. The output assembly 15 comprises a plurality of optical waveguides or fibers which act as inputs or outputs or, in bidirectional mode, as both.

According to the embodiment shown in FIG. 1, the LIDAR system operates in bidirectional mode. This means that a light pulse from the at least one light source 2 exits the duplexer by the third and fourth ports 412 and 421 and leaves the LIDAR system 1 by the at least one light emitting output 11 and at the same time by the at least one light receiving input 12. The light is emitted into the free space and illuminates a scene or a target 85. The light is at least partly reflected by the target 85. The reflected light is directed at least partly into the light receiving input 12 of the LIDAR system 1. Due to the bidirectional operation, the light is received as well by the light emitting output 11. The output 11 and the input 12 may be arranged adjacent in the output assembly 15 of the LIDAR system 1. This allows for a coaxial monostatic operation which is the preferred operation principle from the optical point of view. The transmit pattern of each element corresponds exactly to the detector's field of view of that element. The field of view is optimal in terms of angular background light rejection.

The light received by the two inputs is directed to the third and fourth port 412 and 421 of the duplexer 4. Due to the multimode nature of the coupler used, no accidental interference between the incoming signals of the two ports occur. This will give a 3 dB gain with respect to a single receive signal as in known LIDAR systems.

The reflected light leaves the duplexer 4 by the first and second ports 411 and 422. The light from the first port 411 is prevented to enter the light source 2 at least by the single mode waveguides 91 acting as a spatial mode filter. The light coming from the second port 422 is directed to a respective light detector 3. The light detector 3 may comprise any of a photodiode, a photodiode array, a CCD-device, a photo resistor, a photo transistor or any other known element in the art converting optical signals in electrical signals. The electrical signals are delivered to an evaluation unit not shown in FIG. 1.

The evaluation unit may comprise any of an A/D-converter, a time digitizer, a microprocessor or a microcontroller and some storage. The evaluation unit is adapted to calculate from the time-of-flight of the pulsed light a distance between the LIDAR system 1 and the target 85. A plurality of targets 85 may be stored as a scatter plot inside the evaluation unit. The evaluation unit may be coupled to further devices such as a steering system, an engine control system or an industrial production machine which performs certain operations on the basis of the data acquired by the LIDAR system 1.

Figure 2:
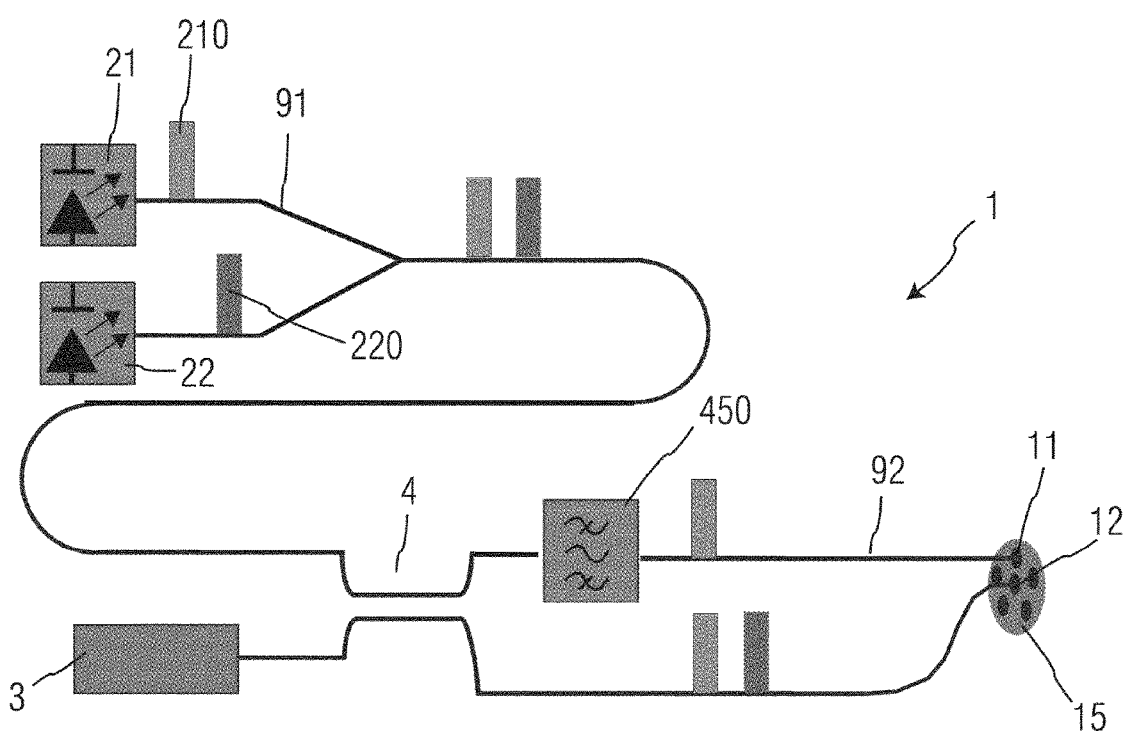
FIG. 2 illustrates a diagram of an exemplary second LIDAR system according to the present invention.

FIG. 2 shows a second embodiment of the LIDAR system 1 according to the invention. Like parts are denoted with like reference numbers. Accordingly, the following description will be restricted to the main differences between the first and second embodiments. Additionally, some optional structures are not shown in FIG. 2. One of ordinary skill in the art will easily recognize how to implement a splitter, an optical amplifier or a modulator into the second embodiment by looking at the description of the first embodiment.

As can be seen from FIG. 2, the second embodiment uses a first light source 21 and a second light source 22. The light sources are configured to emit first and second light pulses 210 and 220 having different wavelengths and different timing, i.e. the second light pulse 220 is shifted to a later time by the amount Δt compared to the first light pulse 210.

The light pulses 210 and 220 enter a duplexer 4 by its first port 411. The optical power exits the duplexer 4 by the third and fourth port 412 and 421.

Behind one of the exit ports, a spectral filter 450 is provided. In the example shown, the spectral filter 450 is arranged behind the fourth port 421 of the duplexer 4. The spectral filter 450 is adapted to filter the second light pulse 220. Remaining light is delivered to the at least one light emitting output 11. Both pulses travel on a waveguide 92 being connected to the third port 412 of a duplexer 4 to the at least one light receiving input 12. The light is directed to a target as explained earlier. Light reflected from the target is received at least partly by the light emitting output 11 and the light receiving input 12. As explained earlier, the light is directed to at least one light detector 3 and the electrical signals from the light detector 3 are supplied to an evaluation unit.

Figure 3:
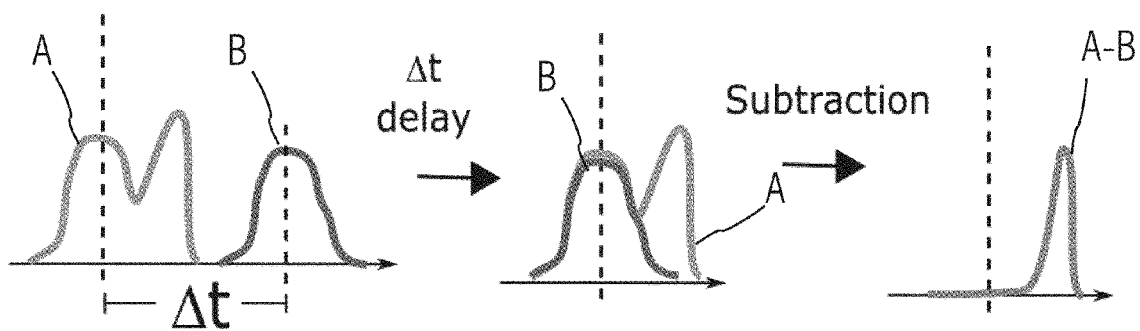
FIG. 3 illustrates a timing diagram showing an exemplary reflected light pulse that can be received by the LIDAR system of FIG. 2.

FIG. 3 illustrates the data received by the light detector 3. FIG. 3 shows three diagrams wherein the intensity is shown on the ordinate axis and the time is shown on the abscissa.

The very left-hand plot in FIG. 3 shows the timing diagram as received by the light detector 3. The detector receives two time shifted signals of the first wavelength coming from the light emitting output 11 and the light receiving input 12. These two time shifted signals are denoted with reference A. Furthermore, the detector receives one signal of the second wavelength from the light receiving input 12. This signal is denoted with B.

The evaluation unit is adapted to shift the signal of the second wavelength by the amount Δt which corresponds to the time delay between the second and first light pulses 220 and 210. The resulting signal after applying the time delay is shown in the middle plot of FIG. 3.

Finally, as can be seen in the right-hand plot of FIG. 3, the evaluation unit performs a subtraction. The result is a signal which would correspond to the reflected signal if the first wavelength was sent via the at least one light emitting output 11 only.

In summary, if only the first pulse 210 is used, the LIDAR performs as shown with respect to FIG. 1. In case both lasers 21 and 22 emit light at different wavelength and times, the detector 3 receives the reflected signal 210 sent at time t via the output 11 and the input 12. In addition, the detector 3 receives the reflected signal of the second wavelength sent at time t+Δt via the light receiving input 12. If the detector is fast enough to discriminate between the two signal ports 11 and 12, these two ports can be treated as two separate pixels. Thus, in this mode of operation, the resolution of the LIDAR system according to the invention is increased by a factor of 2. The different modes of operation can be chosen according to the requirements. Due to the bidirectional operation of the output 11 and the input 12, the LIDAR system is classified as coaxial monostatic.

Figure 4:
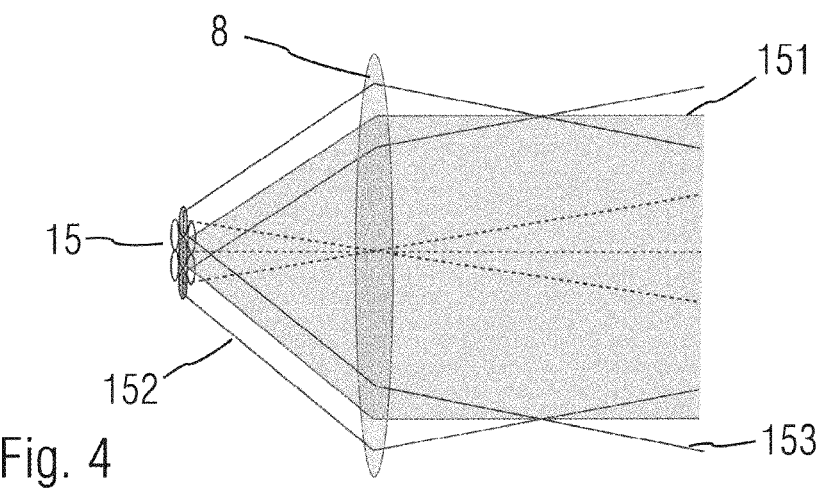
FIG. 4 illustrates an optics for adapting the field of view of a LIDAR system to specific needs.

FIG. 4 shows a front optics being usable with a LIDAR system according to the invention. The light emitting outputs 11 and the light receiving inputs 12 are arranged in an output assembly on a first side of an optics 8. The target 85 is arranged on a second side of the optics 8. The example shows an array of 7 fibers. Each fiber is bidirectional, comprising a light emitting output and a light receiving input and each fiber having a different acceptance and emittance. The acceptance ranges of the fibers are denoted with reference numbers 151, 152 and 153. The optics 8 matches the acceptance of the fiber bundle to the projected target size. It should be clear to one of ordinary skill in the art that the optics 8 may comprise at least one lens as shown in FIG. 4. In other embodiments of the invention, the optics 8 may comprise a plurality of lenses or mirrors in order to engineer good imaging properties.

Figure 5:
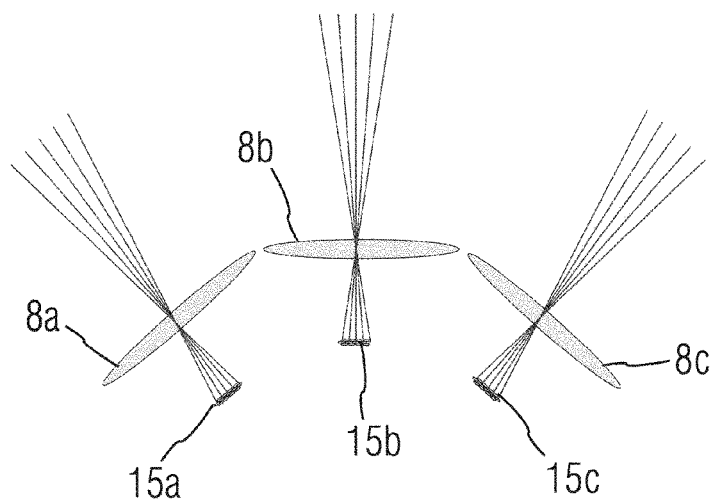
FIG. 5 illustrates a diagram of an exemplary segmented field of view of the LIDAR system.

FIG. 5 shows the augmentation of the field of view by using a plurality of fiber bundles with their associated front optics. In the embodiment shown, three fiber bundles with their associated front optics as shown in FIGS. 1 and 2 are used to increase the field of view further.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. While the invention has been described by reference to certain preferred embodiments, it should be understood that these embodiments are within the spirit and scope of the inventive concepts described. This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Although specific terms are employed herein, they are used in a generic and descriptive sense only and not for purposes of limitation. Accordingly, it is intended that the invention not be limited by the embodiments, but that it have the full scope permitted by the language of the following claims.

What is claimed is:

1. A LIDAR device comprising:
   at least one light emitting output;
   at least one light receiving input;
   at least one light source adapted to emit pulsed laser radiation, and comprising:
      a first light source adapted to emit pulsed laser radiation at a first wavelength; and
      a second light source adapted to emit pulsed laser radiation at a second wavelength different from the first wavelength, and at different times;
   at least one light detector adapted to receive reflected laser radiation; and
   at least one duplexer having four ports including a first port, a second port, a third port and a fourth port, the at least one duplexer configured to guide laser radiation simultaneously from the first port to both the third port and the fourth port;
   wherein:
      the at least one light source is coupled to the first port of the duplexer;
      the fourth port of the duplexer is coupled to the light emitting output, with a spectral filter positioned between said fourth port and said light emitting output, the spectral filter adapted to filter at least the second wavelength;
      the third port of the duplexer is coupled to the light receiving input; and
      the second port of the duplexer is coupled to the light detector.

2. The LIDAR device according to claim 1, comprising:
   a plurality of duplexers, each duplexer having four ports; and
   at least one splitter having a single splitter input and a plurality of splitter outputs;
   wherein:
   the splitter input is coupled to the light source and each of the splitter outputs is coupled to a respective first port of a respective duplexer.

3. The LIDAR device according to claim 2, comprising an equal number of splitter outputs, duplexers, light detectors, light emitting outputs and light receiving inputs.

4. The LIDAR device according to claim 2, comprising:
   a plurality of light detectors, a plurality of light emitting outputs and a plurality of light receiving inputs;
   wherein:
   the splitter outputs, the duplexers, the light detectors, the light emitting outputs, and the light receiving inputs are connected by optical multimode waveguides.

5. The LIDAR device according to claim 4, wherein the splitter, the duplexers, the light detectors, and the optical multimode waveguides are all integrated on a single chip.

6. The LIDAR device according to claim 1, further comprising:
   an optical amplifier having an amplifier input and an amplifier output; wherein:
   the amplifier input is coupled to an output of the light source, and the amplifier output is coupled to the first port of the duplexer.

7. The LIDAR device according to claim 6, further comprising:
   an optical modulator having a modulator input and a modulator output; wherein:
   the modulator input is coupled to the output of the light source, and the modulator output is coupled to the amplifier input.

8. The LIDAR device according to claim 7, further comprising:
   at least one splitter having a single splitter input and a plurality of splitter outputs;
   wherein:
   the light source, the optical modulator, the optical amplifier, and the single splitter input are connected by single mode waveguides.

9. The LIDAR device according to claim 1, wherein the light source comprises a single mode laser.

10. The LIDAR device according to claim 1, further comprising a front optics, wherein the light emitting output and the light receiving input are arranged on a first side of the front optics and a target is arranged on a second side of the optics.

11. The LIDAR device according to claim 1, wherein an optical axis of the light emitting output coincides with an optical axis of the light receiving input.

12. The LIDAR device according to claim 1, wherein a difference between the second wavelength and the first wavelength is at least 20 nm.

13. A LIDAR device comprising:
   a plurality of duplexers, each duplexer comprising at least one directional 3 dB-coupler and having four ports including a first port, a second port, a third port and a fourth port, each duplexer configured to guide laser radiation simultaneously from the first port to both the third port and the fourth port;
   at least one splitter having a single splitter input and a plurality of splitter outputs, wherein each of the splitter outputs is coupled to the first port of a corresponding one of the duplexers;
   a light source adapted to emit pulsed laser radiation and coupled to the single splitter input, the light source comprising:
      a first light source adapted to emit pulsed laser radiation at a first wavelength; and
      a second light source adapted to emit pulsed laser radiation at a second wavelength different from the first wavelength, and at different times;
   an output assembly comprising:
      a plurality of light emitting outputs, each coupled to the fourth port of a corresponding one of the duplexers; and
      a plurality of light receiving inputs, each coupled to the fourth third port of a corresponding one of the duplexers;
   a spectral filter positioned between the fourth port of each of said duplexers and the light emitting output coupled to that fourth port the spectral filter adapted to filter the second wavelength; and
   a plurality of light detectors adapted to receive reflected laser radiation, each light detector coupled to the second port of a corresponding one of the duplexers.

14. The LIDAR device according to claim 13, further comprising:
   an optical amplifier having an amplifier input and an amplifier output; wherein:
   the amplifier input is coupled to an output of the light source, and the amplifier output is coupled to the first port of each of the duplexers.

15. The LIDAR device according to claim 14, further comprising:
   an optical modulator having a modulator input and a modulator output; wherein:

the modulator input is coupled to the output of the light source, and the modulator output is coupled to the amplifier input.

16. The LIDAR device according to claim 15, wherein the light source, the optical modulator, the optical amplifier, and the single splitter input are connected by single mode waveguides.

17. The LIDAR device according to claim 13, wherein the splitter outputs, the duplexers, the light detectors, the light emitting outputs, and the light receiving inputs are connected by optical multimode waveguides.

18. The LIDAR device according to claim 13, wherein a difference between the second wavelength and the first wavelength is at least 20 nm.

19. A method for optical remote sensing of a target, comprising:
  generating, by means of at least one first light source, at least one first laser pulse having a first wavelength;
  generating, by means of at least one second light source, at least one second laser pulse having a second wavelength different from the first wavelength;
  guiding said first laser pulse to a first port of a duplexer and further guiding said first laser pulse from said first port, simultaneously to a third port and to a fourth port of said duplexer;
  simultaneously emitting said first laser pulse to the target from: (i) at least one light emitting output coupled to the fourth port of the duplexer, and (ii) at least one light receiving input coupled to the third port of the duplexer;
  emitting the second laser pulse to the target, at a different time than a time at which the first laser pulse was emitted to the target, and blocking said second laser pulse by means of a bandpass filter inserted between the fourth port and said light emitting output
  receiving light reflected by the target, at said light emitting output and at said light receiving input;
  guiding said reflected light, from the light emitting output and the light receiving input, to the third port and the fourth port of the duplexer, respectively;
  further guiding said reflected light to at least the second port of the duplexer; and
  detecting at least a portion of said reflected light by means of at least one first light detector coupled to the second port of the duplexer.

20. The method according to claim 19, further comprising:
  guiding said at least one first laser pulse to at least one splitter having a single splitter input and a plurality of splitter outputs, wherein each of the splitter outputs is coupled to the first port of the duplexer.

21. The method according to claim 19, wherein a difference between the second wavelength and the first wavelength is at least 20 nm.

* * * * *